United States Patent [19]
Furihata et al.

[11] Patent Number: 5,623,410
[45] Date of Patent: Apr. 22, 1997

[54] HYDRAULIC SUSPENSION SYSTEM FOR A VEHICLE CAB

[75] Inventors: Kenichi Furihata; Fumiaki Takei, both of Kanagawa, Japan

[73] Assignee: Isuzu Motors Ltd., Tokyo, Japan

[21] Appl. No.: 414,715

[22] Filed: Mar. 31, 1995

[51] Int. Cl.$^6$ .......................... B60G 17/00; B62D 33/10
[52] U.S. Cl. ................ 364/424.046; 180/89.13; 180/89.15; 296/190
[58] Field of Search .................. 364/424.05; 180/89.12, 180/89.13, 89.14, 89.15, 89.16; 280/707; 296/190

[56] References Cited

U.S. PATENT DOCUMENTS

| | | | |
|---|---|---|---|
| 4,451,079 | 5/1984 | Takahashi | 296/190 |
| 4,515,234 | 5/1985 | Loy et al. | 180/89.12 |
| 5,044,455 | 9/1991 | Tecco et al. | 180/89.13 |
| 5,555,501 | 9/1996 | Furihata et al. | 364/424.05 |

Primary Examiner—Gary Chin
Attorney, Agent, or Firm—John E. Toupal; Harold G. Jarcho

[57] ABSTRACT

A vehicle cab attitude controlling system including a frame supported by wheels of the vehicle, a cab mounted on the frame; a cab suspension system mounting the cab on the frame and allowing relative movement therebetween, the cab suspension system having a plurality of seats each supporting a different portion of the cab and at least one seat being detachable therefrom; and a cab actuator for activating the cab suspension system to adjust vertical displacements between said frame and the seats. Also included is an engine mounted on the frame below the cab; an auxiliary actuator for producing pivotal movement of the cab off of the one seat to provide access to the engine; a cab sensing system for detecting vertical displacements between the frame and a plurality of spaced apart portions of the cab and the vertical displacement between the frame and the one seat; and a control system for controlling the cab actuator in response to the cab sensing system, and operable with the cab supported on the one seat to maintain a given attitude of the cab with respect to a road surface, and operable with the cab detached from the one seat to establish a predetermined vertical displacement between the frame and the one seat.

12 Claims, 9 Drawing Sheets

FIG. 7

- p51: hydraulic actuator driving routine
- p52: read oil pressure pFL to pRR of hydraulic actuators
- p53: convert oil pressure pFL to pRR to voltages VsFL to VsRR
  - $VsFL = Ks \cdot pFL$
  - $VsFR = Ks \cdot pFR$
  - $VsRL = Ks \cdot pRL$
  - $VsRR = Ks \cdot pRR$
- p54: obtain exciting voltages VeFL to VeRR of oil control valves
  - $VeFL = VcFL - VsFL$
  - $VeFR = VcFR - VsFR$
  - $VeRL = VcRL - VsRL$
  - $VeRR = VcRR - VsRR$
- P55: excite oil control valves and adjust oil quantities QFL to QRR
  - $QFL = GvFL \cdot VeFL$
  - $QFR = GvFR \cdot VeFR$
  - $QRL = GvRL \cdot VeRL$
  - $QRR = GvRR \cdot VeRR$
- p56: drive hydraulic actuators
- p57: return to present program 5,623,410

HYDRAULIC SUSPENSION SYSTEM FOR A VEHICLE CAB

BACKGROUND OF THE INVENTION

The present invention relates generally to a hydraulic suspension system for a vehicle cab, and, more particularly, to such a system in which the cab is pivoted on a vehicle frame to expose an engine during repair operations.

Disclosed in Japanese Utility Model Laid-Open No. 63-158481 (1988) is a pneumatic spring type suspension apparatus in which a levelling valve and a cutoff valve are connected in series between an air reservoir and pneumatic springs which support a vehicle cab. When the cab is tilted, the pneumatic springs are sealed by the cutoff valve. However, since the cutoff valve merely prevents flow between the air tank and the pneumatic springs, removal of a load from the rear pneumatic springs after the cab has been titled, causes the rear springs to move upwardly complicating return of the cab to its operating position.

A similar problem exists with prior hydraulic vehicle cab suspension systems. As shown in FIGS. 1 and 2, a bottom portion of a cab 3 is supported on a vehicle frame 25 at four corner positions by hydraulic suspension mechanisms 19LF to 19RR. When the cab 3 is pivoted forwardly about a tilt shaft 51 for maintenance and repair of an engine (not shown) disposed under the cab 3, the rear hydraulic suspension mechanisms 19RL and 19RR are released from the load of the cab 3. Consequently, an air chamber of an accumulator communicating with each piston of the hydraulic suspension mechanisms 19RL and 19RR is extended to lift an attached bed or seat increasing its height by an amount h. For this reason, when the cab 3 is being returned to its operating orientation, the positions of the receiving seats 55 of the rear hydraulic suspension mechanisms deviate from the locus of the engaging members of the cab 3 to thereby prevent smooth locking thereof.

The object of this invention, therefore, is to provide a hydraulic suspension system which can assure proper positioning of the receiving seats of rear hydraulic suspension mechanisms when a vehicle cab is being returned to an operating position and thereby facilitating smooth engagement thereof with the receiving seats.

SUMMARY OF THE INVENTION

The invention is a vehicle cab attitude controlling system including a frame supported by wheels of the vehicle; a cab mounted on the frame; a cab suspension system mounting the cab on the frame and allowing relative movement therebetween, the cab suspension system having a plurality of seats each supporting a different portion of the cab and at least one seat being detachable therefrom; and a cab actuator for activating the cab suspension system to adjust vertical displacements between said frame and the seats. Also included is an engine mounted on the frame below the cab; an auxiliary actuator for producing pivotal movement of the cab off of the one seat to provide access to the engine; a cab sensing system for detecting vertical displacements between the frame and a plurality of spaced apart portions of the cab and the vertical displacement between the frame and the one seat; and a control system for controlling the cab actuator in response to the cab sensing system, and operable with the cab supported on the one seat to maintain a given attitude of the cab with respect to a road surface, and operable with the cab detached from the one seat to establish a predetermined vertical displacement between the frame and the one seat. Establishing a predetermined vertical spacing for the one seat facilitates proper engagement of the cab upon a return to a travel position.

According to one feature of the invention, the one seat is detachable from one rear corner portion of the cab, another seat is detachable from an opposite rear corner portion of the cab, the auxiliary actuator pivots the cab off of both the one and another seats to provide access to the engine, and the control system is operable with the cab detached from the one and another seat to establish the predetermined vertical displacement between the frame and each of the seats. This feature further simplifies pivotal cab movement that provides both engine access and secure reengagement.

According to another feature, the invention includes an initiator switch manually activatable into a condition providing power to the engine and the control system, a manually activated release mechanism activatable to facilitate pivotal movement of the cab, and an auxiliary switch for providing operating power to the control system in response to activation of the release mechanism. The auxiliary switch automatically provides control system power in response to release of the cab from the supporting seats.

According to another feature, the invention includes a timer for controlling the auxiliary switch to remove operating power from the control system a predetermined time period after activation of the release mechanism. The timer prevents unnecessary energization of the control system after establishment of desired predetermined displacements for the disengaged seats.

DESCRIPTION OF THE DRAWINGS

These and other objects and features of the invention will become more apparent upon a perusal of the following description taken in conjunction with the accompanying drawings wherein:

FIG. 7 is a flow chart of the control program;

DESCRIPTION OF THE PREFERRED EMBODIMENTS

Figure 1:
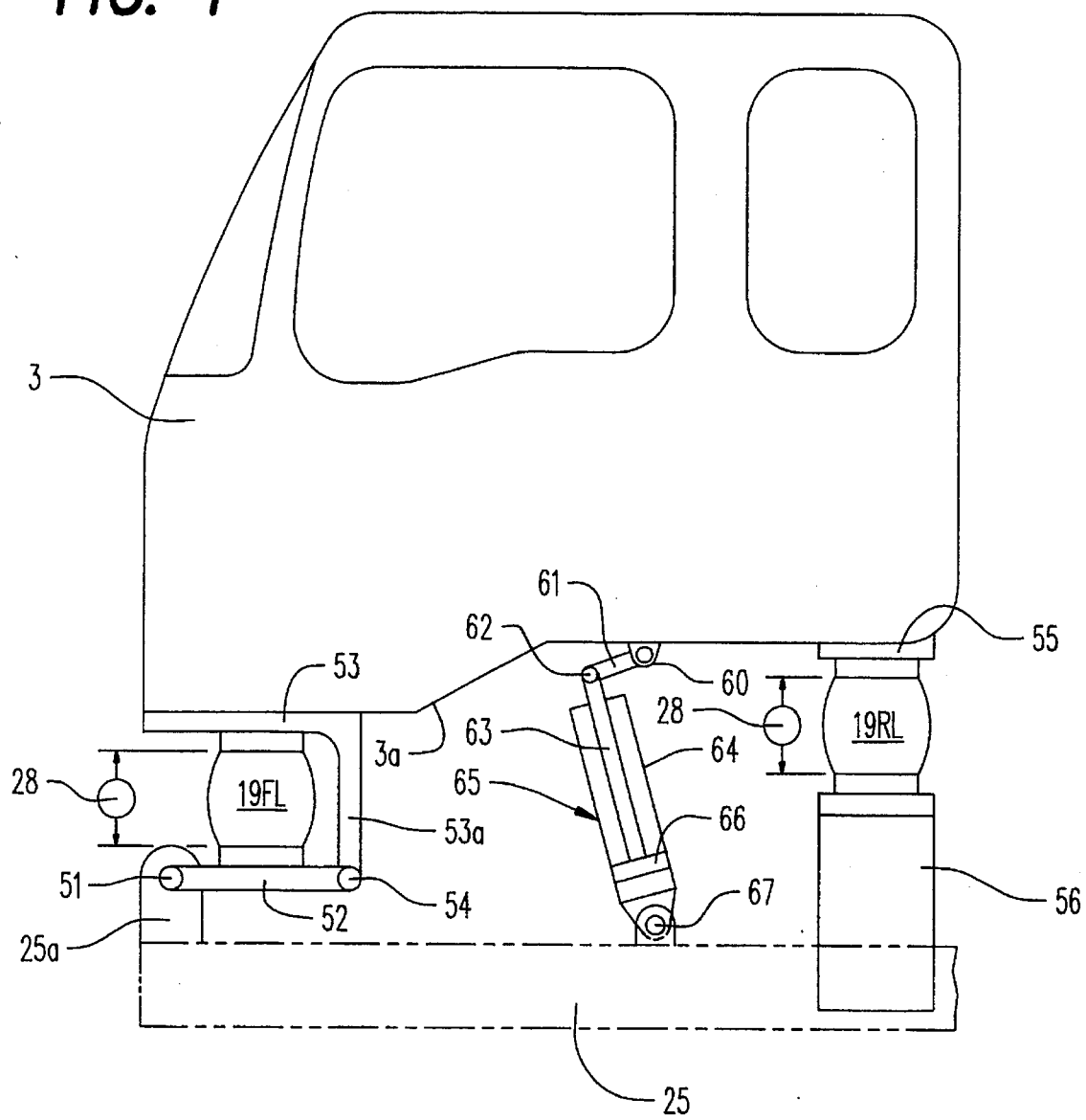
FIG. 1 is a side view of a hydraulic suspension system for a vehicle cab according to the present invention.
Figure 2:
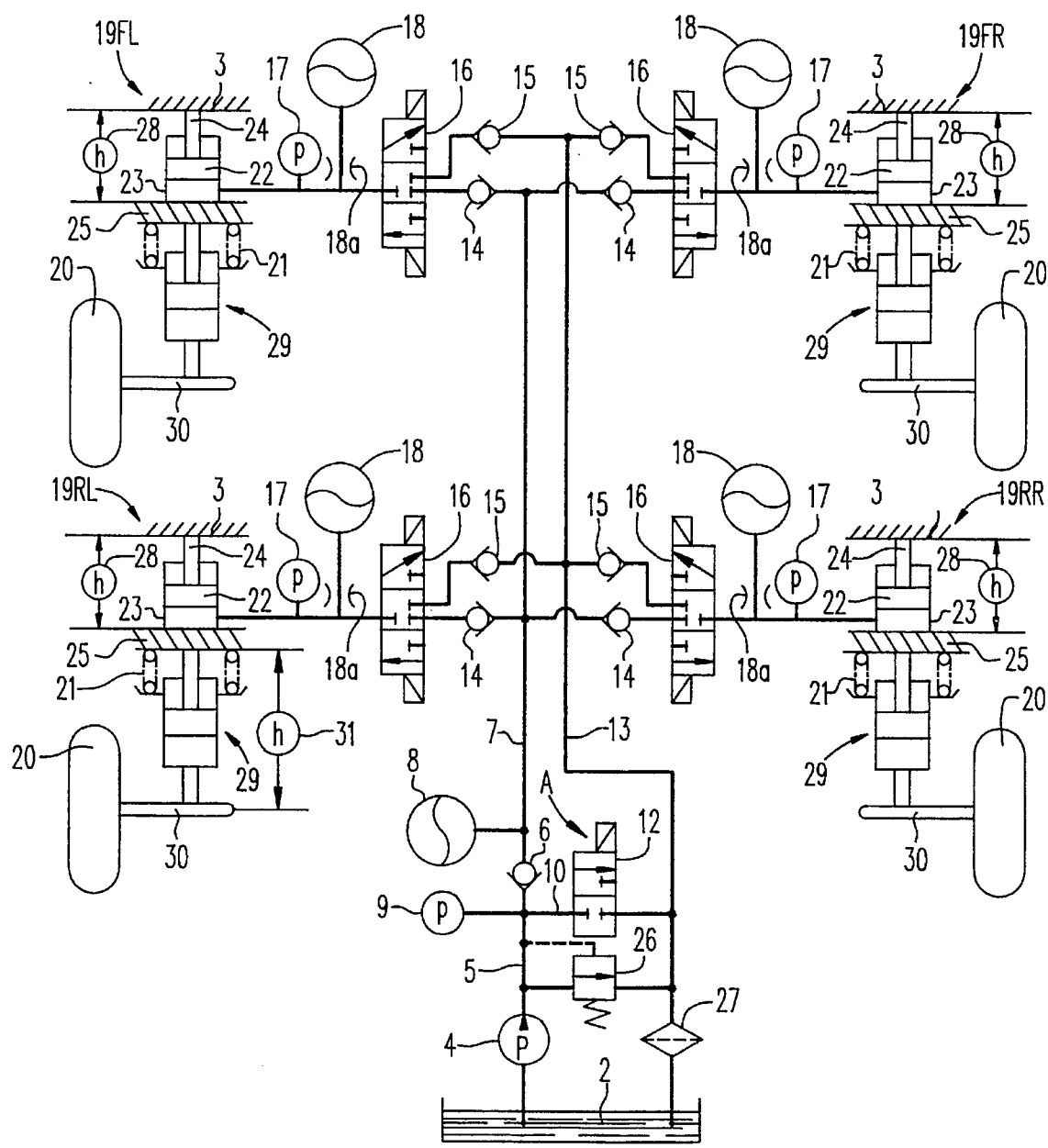
FIG. 2 shows a hydraulic circuit of the hydraulic suspension system shown in FIG. 1.

Illustrated in FIG. 1 is a hydraulic vehicle cab suspension system and FIG. 2 depicts hydraulic circuit for the system. A vehicle frame 25 is suspended on wheels 20 by known spring type suspension mechanisms each having a hydraulic shock-absorber or buffer 29 and a spring 21. Each hydraulic buffer 29 includes a cylinder and piston assembly having the cylinder 23, connected to an axle 30 or a suspension member, and a rod projecting upwardly from the piston 22 connected to the vehicle frame 25. Interposed between the cylinder 23 and the vehicle frame 25 is a spring 21.

As shown in FIGS. 1 and 2, front left, front right, rear left, and rear right corners of a bottom cab frame 3a are each supported on the vehicle frame 25 by, respectively, hydraulic suspension mechanisms 19FL, 19FR, 19RL and 19RR and an accumulator 18. In each hydraulic suspension mechanism 19FL–19RR, the piston 22 is provided with an orifice or throttle passage (not shown) which communicates between lower and upper end chamber 3 of the cylinder 23. The lower end chamber of the cylinder 23 is supplied pressured oil and the upper end chamber discharges into an oil tank 2.

In each of the front hydraulic suspension mechanisms 19FL and 19FR, a rod 24 projecting from the piston 22 is connected to a support plate 53 (FIG. 1) of the bottom frame 3a and the cylinder 23 is connected to an arm 52 on the vehicle frame 25. An inner end of each arm 52 is connected to a support plate 25a on the vehicle frame 25 by a pivot pin 51 and an outer end is connected by a pin 54 to a leg 53a projecting downwardly from the support shaft 53 of the cab 3. In each rear hydraulic suspension mechanism 19RL, 19RR, the rod 24 is connected to a lift bed or seat 55 and the cylinder 23 is connected to a mount 56 of the vehicle frame 25.

An auxiliary, cab release hydraulic actuator 65 for pivotally tilting the cab 3 is mounted between the frame 25 and the frame 3a. The actuator 65 has a cylinder 64 connected to the vehicle frame 25 by a pin 67, and a rod 63 projecting from a piston 66 connected to an arm 61 attached to the cab 3 by a pin 62. Securing the arm 61 to the cab frame 3a is a pin 60.

Figure 4:
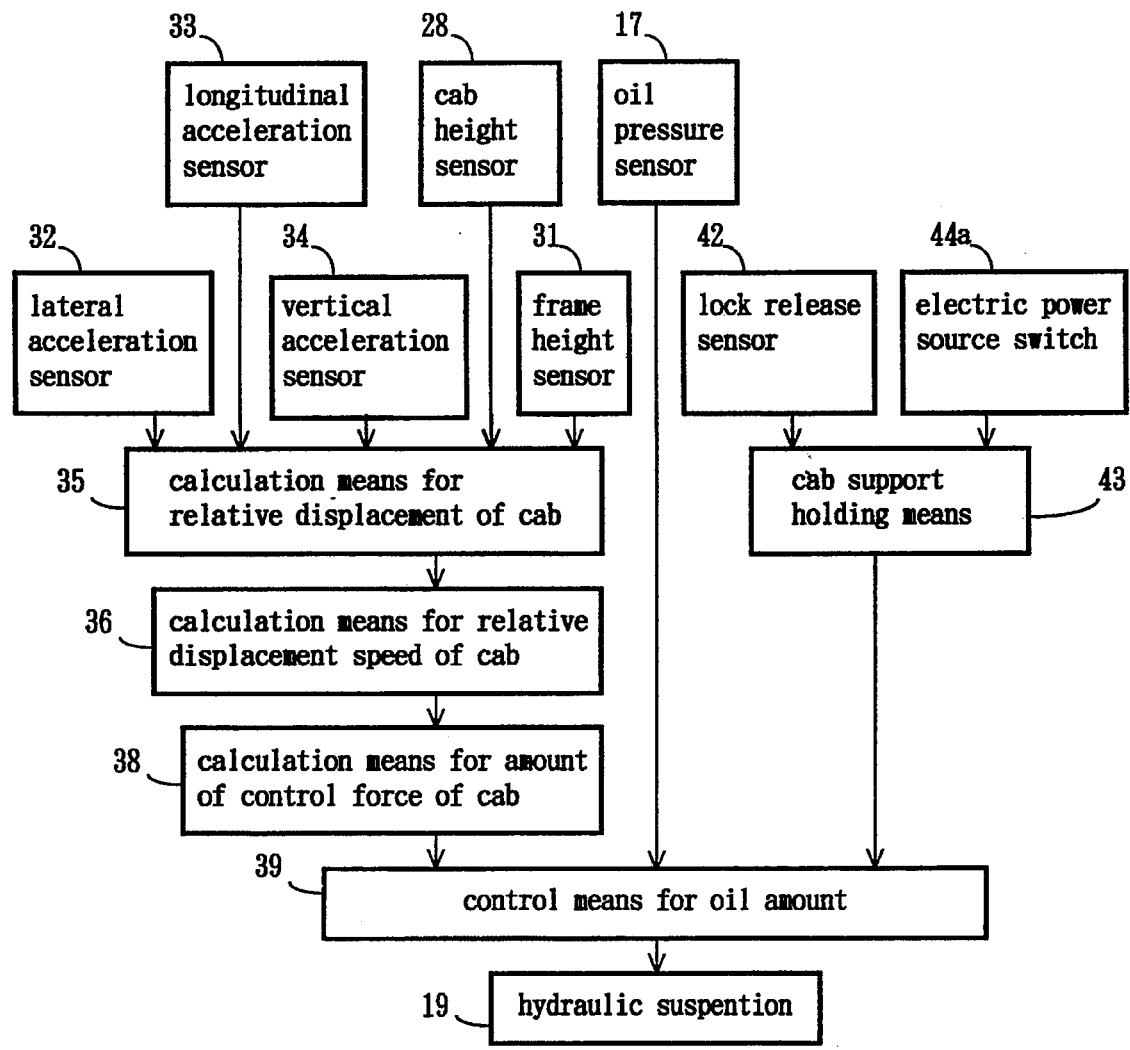
FIG. 4 is a block diagram representative of a cab support holding and cab attitude control program for the system shown in FIG. 1.

Sensors 28 (FIG. 1) detect with respect to the vehicle frame 25 changes in vertical displacements of each corner of the cab 3. In addition, sensors 31 (FIG. 2) detect with respect to the axles 30 changes in vertical displacement of the vehicle frame 25. The sensors 31 are disposed on the spring type suspension mechanisms 29 supporting the vehicle frame 25. As shown in FIG. 4, a lateral acceleration sensor 32, a longitudinal acceleration sensor 33 and a vertical acceleration sensor 34 are disposed on the cab 3 near its center of gravity. The sensors 32–34 provide information for determining roll displacement speed, pitch displacement speed, and bounce displacement speed of the cab 3. Those speed determinations are obtained by integrating lateral acceleration g1, longitudinal acceleration g2 and vertical acceleration g3 detected by the acceleration sensors 32 to 34.

As shown in FIG. 2, a hydraulic pressure source A provides actuating oil pressure for the cab suspension mechanisms 19FL–19RR. The system A includes a hydraulic pump 4 that is driven by the vehicle's engine (not shown) to draw oil from an oil tank 2 and supply the oil through a check valve 6 and a pipe 5 to an accumulator 8 communicating with a pipe 7. An oil pressure holding system A is provided to keep oil pressure to the pipe 7 at a predetermined value pt. When a detected oil pressure pm of a hydraulic sensor 9 exceeds the predetermined value pt, a switching valve 12 returns part of the oil in the pipe 5 to the oil tank 2 through a pipe 10, a pipe 13, and a filter 27. Further, when an oil pressure at a discharge port of the hydraulic pump 4 abnormally increases, part of the oil in the pipe 5 is returned to the oil tank 2 through a well-known relief valve 26, the pipe 13 and the filter 27.

At each suspension mechanism 19FL–19RR, pressured oil in the pipe 7 is supplied to an accumulator 18 through an electromagnetic proportional pressure of a neutral position closed type and an orifice or throttle 18a. Oil also is supplied to a lower end chamber of the cylinder 23 of each hydraulic suspension mechanism 19FL–19RR and oil pressure therein is detected by a hydraulic sensor 17. When a control valve 16 is switched, oil in the lower end chamber of the associated cylinder 23 is returned to the oil tank 2 through the control valve 16, a check valve 15, the pipe 13 and the filter 27. Each cab actuator control valve 16 feedback-controls oil pressure of an associated hydraulic suspension mechanism 19FL–19RR corresponding to a control voltage from an electronic control device comprised of a microcomputer.

Figure 3:
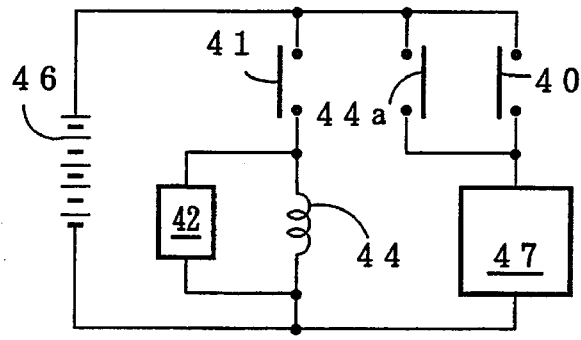
FIG. 3 shows a power supply circuit of an electronic control for the system shown in FIG. 1.

As shown in FIG. 3, an electronic control device 47 for controlling attitude of the cab 3 by regulating oil flow to the hydraulic suspension mechanism 3 19FL–19RR is connected to a power supply battery 46 an initiator ignition switch 40 for the engine. For controlling the suspension mechanisms 19FL–19RR when the cab 3 is to be pivoted off of the frame 25 an auxiliary power supply switch 44a is connected in parallel with the ignition switch 40. A relay coil 44 for activating the auxiliary power supply switch 44a is connected to the power supply 46 through a lock-release switch 41 which closes when the cab 3 is released from the rear seats 55 (FIG. 1). A lock-release indicator means 42 is connected in parallel with the relay coil 44 and detects that the cab 3 has been released to facilitate pivotal movement off of the frame to provide access to the engine.

Let now hFL–hRR be the detected vertical displacements of, respectively, wheel supporting portions of the vehicle frame 25 with respect to a road surface and hcFL–hcRR be the detected vertical displacement of, respectively, the front left, front right, rear left and rear right corners of the cab 3 with respect to the vehicle frame 25; then vertical displacement changes xFL–xRR at the corresponding vehicle frame 25 positions and vertical displacement changes xcFL–xcRR at the corresponding corners of the cab 3 are expressed by the following equation (1):

$$xFL = hFL - hFLO, \quad xFR = hFR - hFRO \quad (1)$$
$$xRL = hRL - hRLO, \quad xRR = hRR - hRRO$$
$$xcFL = hcFL - hcFLO, \quad xcFR = hcFR - hcFRO$$
$$xcRL = hcRL - hcRLO, \quad xcRR = hcRR - hcRRO$$

wherein, hFLO to hRRO : standard vehicle heights of wheel supporting portions of the vehicle frame hcFLO to hcRRO: standard vehicle heights of points of the cab.

A relative roll displacement amount $\Delta\phi$ of the vehicle frame 25 with respect to the road surface, a relative pitch displacement amount $\Delta\theta$ of the vehicle frame 25 with respect to the road surface, a relative bounce displacement amount $\Delta x$ of the center of gravity of the vehicle frame 25 with respect to the road surface, a relative roll displacement amount $\Delta\phi$ c of the cab 3 with respect to the vehicle frame 25, a relative pitch displacement amount $\Delta\theta$ c of the cab 3 with respect to the vehicle frame 25 and a relative bounce displacement amount $\Delta$ xc of the center of gravity of the cab with respect to the vehicle frame 25 are respectively expressed by the following equation (2):

$$\Delta\phi = K11(xFL - xFR) + K12(xRL - xRR) \quad (2)$$
$$\Delta\theta = K21(xFL + xFR) - K22(xRL + xRR)$$
$$\Delta x = K31(xFL + xFR) + K32(xRL + xRR)$$
$$\Delta\phi c = Kc11(xcFL - xcFR) + Kc12(xcRL - xcRR)$$

-continued $$\Delta\theta c = Kc21(xcFL + xcFR) - Kc22(xcRL + xcRR)$$

$$\Delta xc = Kc31(xcFL + xcFR) + Kc32(xcRL + xcRR)$$

wherein,

K11, K21, K31 : constant determined by vehicle data
K12, K22, K32 : constant determined by vehicle data
Kc11, Kc21, Kc31 : constant determined by vehicle data
Kc12, Kc22, Kc32 : constant determined by vehicle data Let $\phi$ be the roll displacement amount of the vehicle frame 25, $\theta$ be the pitch displacement amount of the vehicle frame 25 and x be the bounce displacement amount of the vehicle frame 25, then, the roll displacement amount $\phi$ c of the cab 3, the pitch displacement amount $\theta$ c of the cab 3 and the bounce displacement amount xc of the cab can be expressed by the following equation (3):

$$\phi c = \phi + \Delta\phi + \Delta\phi c \tag{3}$$

$$\theta c = \theta + \Delta\theta + \Delta\theta c$$

$$xc = x + \Delta x + \Delta xc$$

Motions of roll, pitch and bounce displacements caused by the change in the road surface when the vehicle runs straight on at even speed can be expressed by the following kinetic equation (4):

$$Ix(d^2\phi c/dt^2) = Mc*go*hr*\phi c - F12 \tag{4}$$

$$Iy(d^2\theta c/dt^2) = Mc*go*hp*\theta c - F22$$

$$Mc(d^2xc/dt^2) - F32$$

wherein,

Ix: inertial moment of the cab with respect to the roll
Iy: inertial moment of the cab with respect to the pitch
Mc: mass of the cab
go: acceleration of the gravity
hr: difference in level between the roll center of the cab and the center of gravity of the cab
hp: difference in level between the pitch center of the cab and the center of gravity of the cab In Equation (4), the first term on the right side is moment [the product of Mc*go and hr*sin$\phi$ c (the product of Mc*go and hp*sin $\theta$ c)] for causing the cab 3 to roll (pitch) due to the acceleration go of the gravity that acts on the center of gravity when the cab 3 is tilted.

Thus, a roll control force F12, a pitch control force F22 and a bounce control force F32 to be applied to the cab 3 by the hydraulic suspension mechanisms 19FL to 19RR in order to keep the cab 3 flat (parallel with the road surface) in consideration of transient characteristics of the motion of the cab 3 are determined as in the following equation (5):

$$\begin{aligned}
F12 = &\ K1\ (\Delta\phi + \Delta\phi c) + K2\ d(\Delta\phi + \Delta\phi c)/dt + \\
&\ K7 \int(\Delta\phi + \Delta\phi c)dt \\
F22 = &\ K3\ (\Delta\theta + \Delta\theta c) + K4\ d(\Delta\theta + \Delta\theta c)/dt + \\
&\ K8 \int(\Delta\theta + \Delta\theta c)dt \\
F32 = &\ K5 \int(\Delta x + \Delta xc) + K6\ d(\Delta x + \Delta xc)/dt + \\
&\ K9 \int(\Delta x + \Delta xc)dt
\end{aligned} \tag{5}$$

wherein,

K1 to K9 : constant

The second term on the right side of Equation (5) is a roll displacement speed $\phi$ c', a pitch displacement speed $\theta$ c' and a bounce displacement speed xc' of the cab 3 obtained by integrating a lateral acceleration g1, a longitudinal acceleration g2 and a vertical acceleration g3 detected by the acceleration sensors 32 to 34. Accordingly, Equation (5) can be expressed by the following equation (6):

$$F12 = K1\ (\Delta\phi + \Delta\phi c) + K2\ d\phi\ c/dt + K7 \int(\Delta\phi + \Delta\phi c)dt \tag{6}$$

$$F22 = K3(\Delta\theta + \Delta\theta c) + K4\ d\theta\ c/dt + K8 \int(\Delta\theta + \Delta\theta c)dt$$

$$F32 = K5\ (\Delta x + \Delta xc) + K6\ dxc/dt + K9 \int(\Delta x + \Delta xc)dt$$

wherein, $d\phi\ c/dt = \int g1\ dt$, $d\theta c/dt = \int g2\ dt$, $dxc/dt = \int g3\ dt$ The aforementioned control forces F12, F22 and F32 correspond to the attitude changes (roll, pitch and bounce) caused by the change in the road surface. Preferably, the control accuracy and response can be improved by adding a control force corresponding to an attitude change of the cab cause by the centrifugal force when the vehicle turns and an inertia force when the vehicle runs in modes of acceleration and deceleration. However, since this has directly nothing to do with the present invention, the explanation thereof is omitted.

As shown in FIG. 4, the attitude control of the cab 3 is carried out on the basis of the aforementioned principle. That is, the vehicle heights hFL to hRR of the vehicle frame, the vehicle heights hcFL to hcRR of the cab 3, and the lateral acceleration g1, longitudinal acceleration g2 and vertical acceleration g3 of the cab are detected by the vehicle height sensor 31, the vehicle height sensor 28 and the acceleration sensors 32 to 34, respectively.

A relative roll displacement amount $\Delta\phi$, a relative pitch displacement amount $\Delta\theta$, a bounce displacement amount $\Delta$ x of the vehicle frame 25 with respect to the road surface, and a relative roll displacement amount $\Delta\phi$ c, a relative pitch displacement amount $\Delta\theta$ c and a relative bounce displacement amount $\Delta$ xc of the cab with respect to the vehicle frame 25 are obtained by a cab displacement amount calculation means 35. A lateral acceleration g1, a longitudinal acceleration g2 and a bounce acceleration g3 are integrated by a cab displacement speed calculation means 36 to obtain a roll displacement speed $\phi$ c', a pitch displacement speed $\theta$ c' and a bounce displacement speed xc' of the cab 3. The roll control force F12, pitch control force F22 and bounce control force F32 of the cab 3 are obtained from the roll displacement amount $\Delta\phi$, the pitch displacement amount $\Delta\theta$ and the bounce displacement amount $\Delta$ x of the vehicle frame 25, and the roll displacement amount $\Delta\phi$ c, the pitch displacement amount $\Delta\theta$ c and the bounce displacement amount $\Delta$ xc of the cab 3, and the roll displacement speed $\phi$ c', the pitch displacement speed $\theta$ c' and the bounce displacement speed xc' of the cab 3 by a can control force calculation means 38. Next, control voltages VcFL to VcRR of the oil amount control valve 16 represented by the following equation (7) corresponding to the aforementioned roll control force F11, the pitch control force F21 and the bounce control force F32 are obtained by an oil amount control means 39.

$$VcFL = -KV1\ F12 - KV2\ F22 + KV5\ F32 \tag{7}$$

$$VcFR = +KV1\ F12 - KV2\ F22 + KV5\ F32$$

$$VcRL = -KV3\ F12 + KV4\ F22 + KV6\ F32$$

$$VcRR = +KV3\ F12 + KV4\ F22 + KV6\ F32$$

wherein,

KV1 to KV6 : constant

Finally, the oil amount control valves 16 are driven on the basis of the control voltages VcFL to VcRR and the feedback signal voltages VsFL to VsRR of the hydraulic sensor 17 to control the hydraulic suspension mechanisms 19FL to 19RR. Then, the attitude of the cab 3 can be kept substantially flat (parallel with the road surface).

Figure 11:
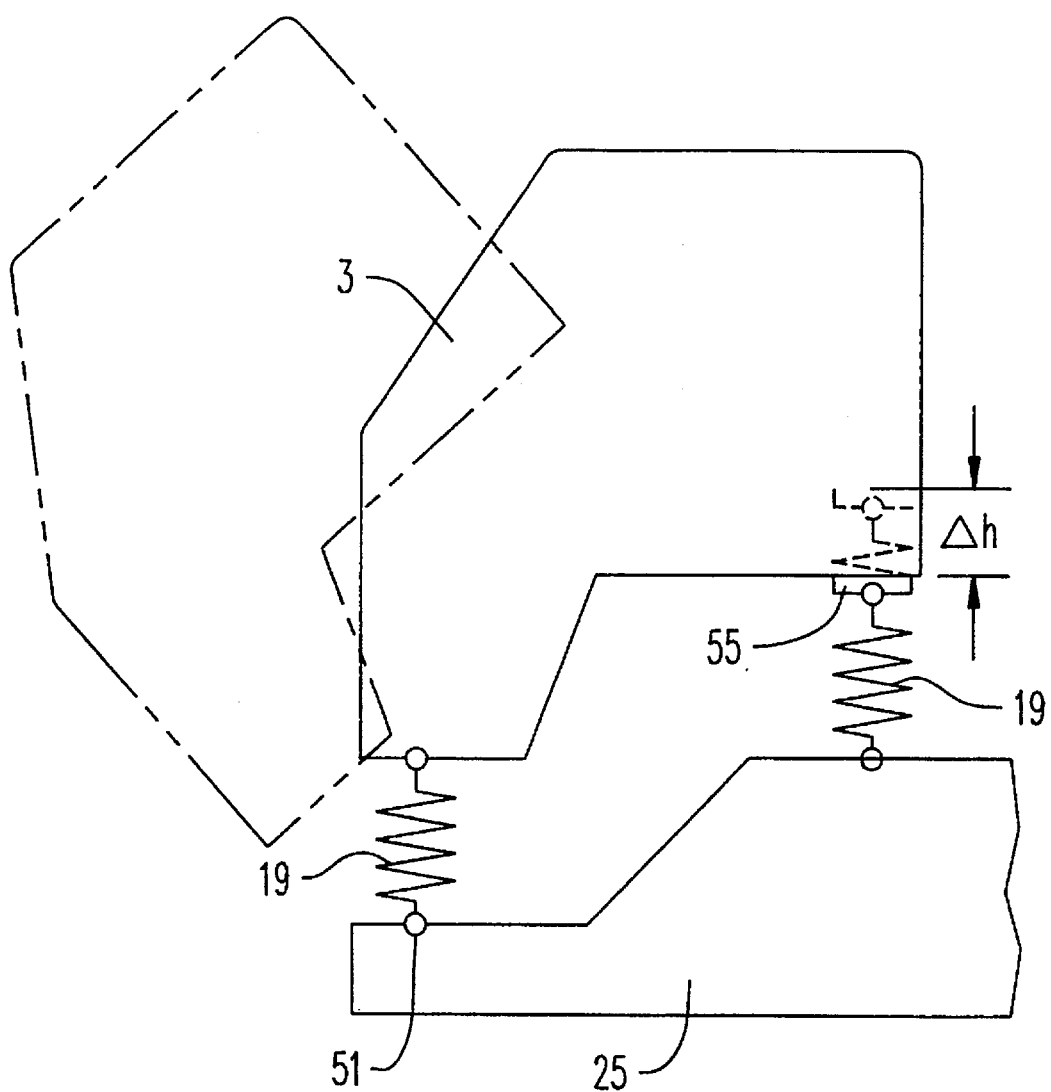
FIG. 11 is a side view illustrating tilting of a cab for engine maintenance.

When the cab 3 is to be pivoted off of the rear seats 55 (FIG. 11) for maintenance of an engine (not shown), a cab support holding control is carried out. Manual release of a tilt-lock of the cab 3 induces closure of a lock-release switch 41 (FIG. 4) to excite the relay coil 44, close the power switch 44a and energize the electronic control device 47. At this time, the lock-release indicator means 42 detects that the tilt-lock is released and vertical displacements of the cab 3 are detected by the height sensors 28. The control votages VcF1–VcRR applied to the control valves 16 (FIG. 2) are set such that the vertical displacements of the rear seats 55 (FIG. 11) are kept at a predetermined value by the cab support holding means 43 (FIG. 4) which provides control voltages VcFL to VcRR for the control valves 16 of the hydraulic suspension mechanisms 19FL–19RR. Preferably, when the heights of the seats 55 are substantially equal to a predetermined value, the power supply switch 44a of the electronic control device 47 is opened to deenergize the control system 47 (FIG. 3). Accordingly, when the cab 3 is tilted back down, the rear seats 55 are at a height capable of being easily and positively locked to the cab 3.

Figure 5:
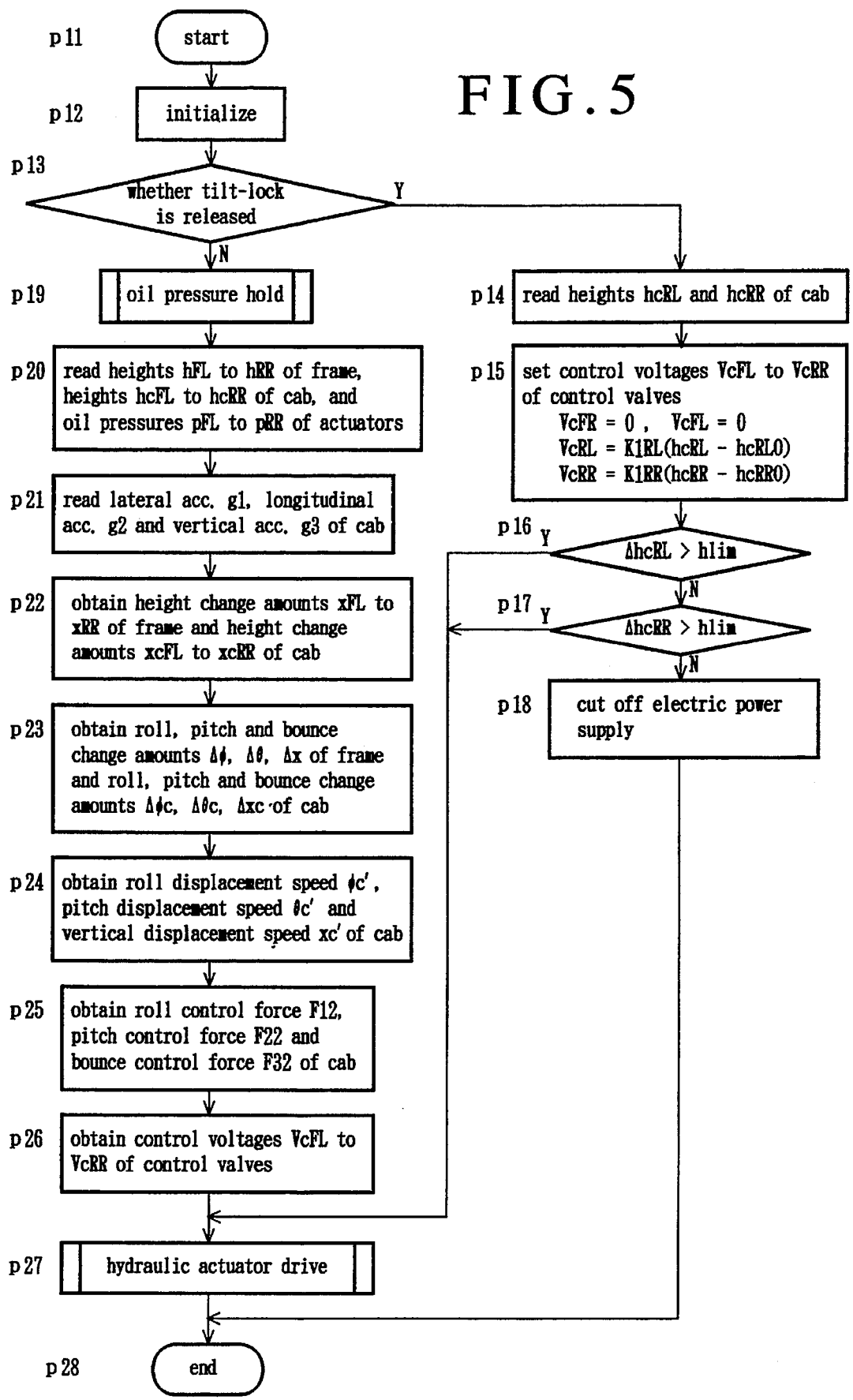
FIG. 5 is a flow chart of the control program.
Figure 6:
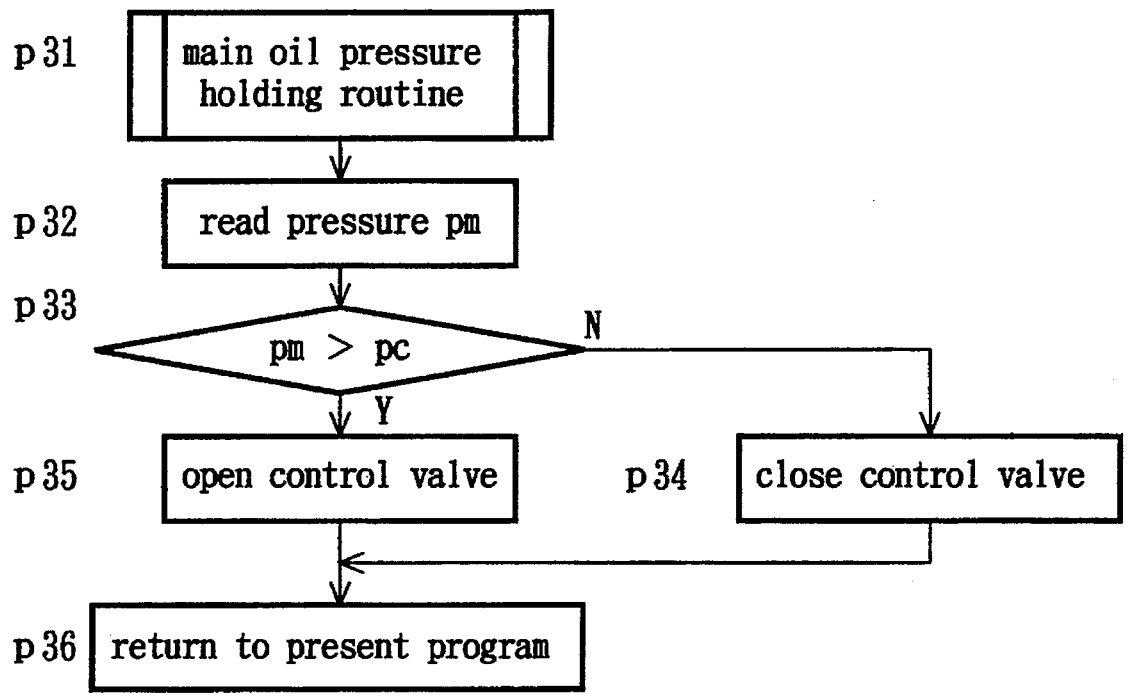
FIG. 6 is a flow chart of the control program.

FIGS. 5 to 7 are respectively flow charts of a control program for performing the aforementioned vehicle height holding control and the attitude control by an electronic control device comprised of a microcomputer. The present control program is repeatedly executed every-predetermined time. p11 to p28, p31 to 36 and p51 to p57 represent the steps of the control program. In p11, the present control program starts. In p12, the initialization is made. In p13, determination is made whether the tilt-lock is released. When the tilt-lock of the cab 3 is not released the step advance to p19. When the tilt-lock of the cab 3 is released, the vehicle heights hcRL and hcRR of the cab 3 are read in p14. In p15, the control voltages vcFL to VcRR of the oil amount control valves 16 are set to vcFR=0, VcFL=0, VcR1=K1RL* $\Delta$ hcRL ($\Delta$ hcRL=hcRL–hcRL0) and VcRR=K1RR*$\Delta$ hcRR ($\Delta$ hcRR=hcRR–hcRR0), wherein, K1RL and K1RR are constant.

In p16, determination is made whether a deviation $\Delta$ hcRL (absolute value) between the detected vehicle height hcRL and a predetermined value (for example, a standard vehicle height) hcRL0 is larger than an allowable error hlim (for example, 8 mm). When the deviation $\Delta$ hcRL is larger than the allowable error hlim, the step advances to p17. When deviation $\Delta$ hcRL is smaller than the allowable error hlim, determination is made in p17 whether the deviation $\Delta$ hcRR (absolute value) between the detected vehicle height hcRR and a predetermined value hcRR0 is larger than an allowable error hlim. When the deviation $\Delta$ hcRR is larger than the allowable error hlim, the step advances to p27. When deviation $\Delta$ hcRR is smaller than the allowable error hlim, determination is made such that the vehicle height (stroke) of the hydraulic suspension mechanisms 19RL and 19RR after the tilting is substantially equal to a predetermined value hcRL0. In p18, the power supply of the electronic control device 47 is cutoff. In p28, the program terminates.

When the tilt-lock of the cab 3 is not released in p13, the step shifts to the oil pressure holding routine in p19, in which the switching valve is driven on the basis of the signal of the hydraulic sensor 9 to keep oil pressure supplied to the pipe 7 at a predetermined value pc. In p20, vehicle heights hFL to hRR of the vehicle frame 25, vehicle heights hcFL to hcRR of the cab 3 and oil pressures pFL to pRR of the hydraulic suspension mechanisms 19FL to 19RR are read from the vehicle height sensor 31, the vehicle height sensor 28 and the hydraulic sensor 17, respectively. In p21, the lateral acceleration g1, the vertical acceleration g2 and the vertical acceleration g3 are read from the acceleration sensors 32 to 34, respectively. In p22, the vehicle height change amounts xFL to xRR of the vehicle frame 25, and the vehicle height change amounts xcFL to xcRR of the cab 3 are read from the vehicle heights hFL to hRR of the vehicle frame 25 and the vehicle heights hcFL to hcRR of the cab 3, respectively.

In p23, relative displacement amounts, that is, the roll displacement amount $\Delta\phi$, the pitch displacement amount $\Delta\theta$ and the bounce displacement amount $\Delta$ x of the vehicle frame 25, and relative displacement amounts, that is, the roll displacement amount $\Delta\phi$ c, the pitch displacement amount $\Delta\theta$ c and the bounce displacement amount $\Delta$ xc of the cab 3 are obtained from the vehicle height change amounts xFL to xRR of the vehicle frame 25 and the vehicle height change amounts xcFL to xcRR of the cab 3, respectively. In p24, the roll displacement speed $\phi$ c', the pitch displacement speed $\theta$ c' and the bounce displacement speed xc' of the cab 3 are obtained from the lateral acceleration g1, the longitudinal acceleration g2 and the vertical acceleration g3, respectively.

In p25, control amounts, that is, the roll control force F12, the pitch control force F22 and the bounce control force F32 of the cab 3 are obtained from the roll displacement amount $\Delta\phi$, the pitch displacement amount $\Delta\theta$, the bounce displacement amount $\Delta$ x of the vehicle frame 25, the roll displacement amount $\Delta\phi$ c, the pitch displacement amount $\Delta\theta$ c, the bounce displacement amount $\Delta$ xc of the cab 3, the roll displacement speed $\phi$ c', the pitch displacement speed $\theta$ c' and the bounce displacement speed xc' of the cab 3, respectively.

In p26, the control voltages VcFL to VcRR of the oil amount control valves 16 corresponding to the control forces F21, F22 and F32 of the cab 3 are obtained. In p27, the step shifts to the hydraulic suspension mechanism driving routine, in which oil amounts of the hydraulic suspension mechanisms 19FL to 19RR are adjusted by the oil amount control valves 16. In p28, the program terminates.

As shown in FIG. 6, in p31, the oil pressure holding routine starts. In p32, output oil pressure pm of the hydraulic pump 4 is read. In p33, determination is made whether the output oil pressure pm is higher than a predetermined value pt. When the output pressure pm is smaller than the predetermined value pc, the switching valve 12 is closed in p34 to increase the pressure. The program advances to p36. In p33, when the output pressure pm is larger than the predetermined value pc, the switching valve 12 is opened to lower the output oil pressure pm, which is kept at the predetermined value pc. In p36, the program returns to the present program.

As shown in FIG. 7, in p51, the hydraulic suspension mechanism driving routine starts. In p52, the oil pressures pFL to pRR of the hydraulic suspension mechanisms 19FL to 19RR are read from the hydraulic sensors 17, and in p53, the oil pressures pFL to pRR are converted into the voltages VsFL to VsRR (KS is constant). In p54, the exciting voltages VeFL to VcRR of the oil amount control valves 16 are obtained from the control voltages VcFL to VcRR and the voltages VsFL to VsRR. In p55, the oil amount control valves 16 are excited to adjust oil amounts QFL to QRR (GvFL to GvRR are constant) supplied to or discharged from the hydraulic suspension mechanisms 19FL to 19RR. In p56, the hydraulic suspension mechanisms 19FL to 19RR are driven. In p57, the program returns to the present program.

Figure 8:
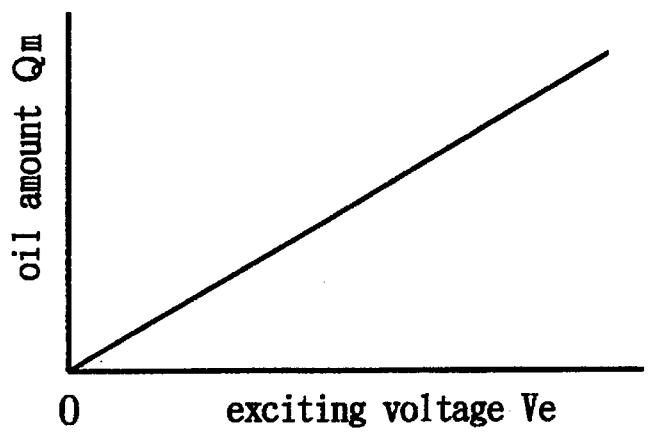
FIG. 8 is a diagram representative of a relationship between exciting voltage and control valve oil supply.

As shown in FIG. 8, the oil amounts QFL to QRR to the hydraulic suspension mechanisms 19FL to 19RR are adjusted by the exciting voltages VeFL to VeRR of the oil amount control valves 16.

MODIFIED EMBODIMENT

Figure 9:
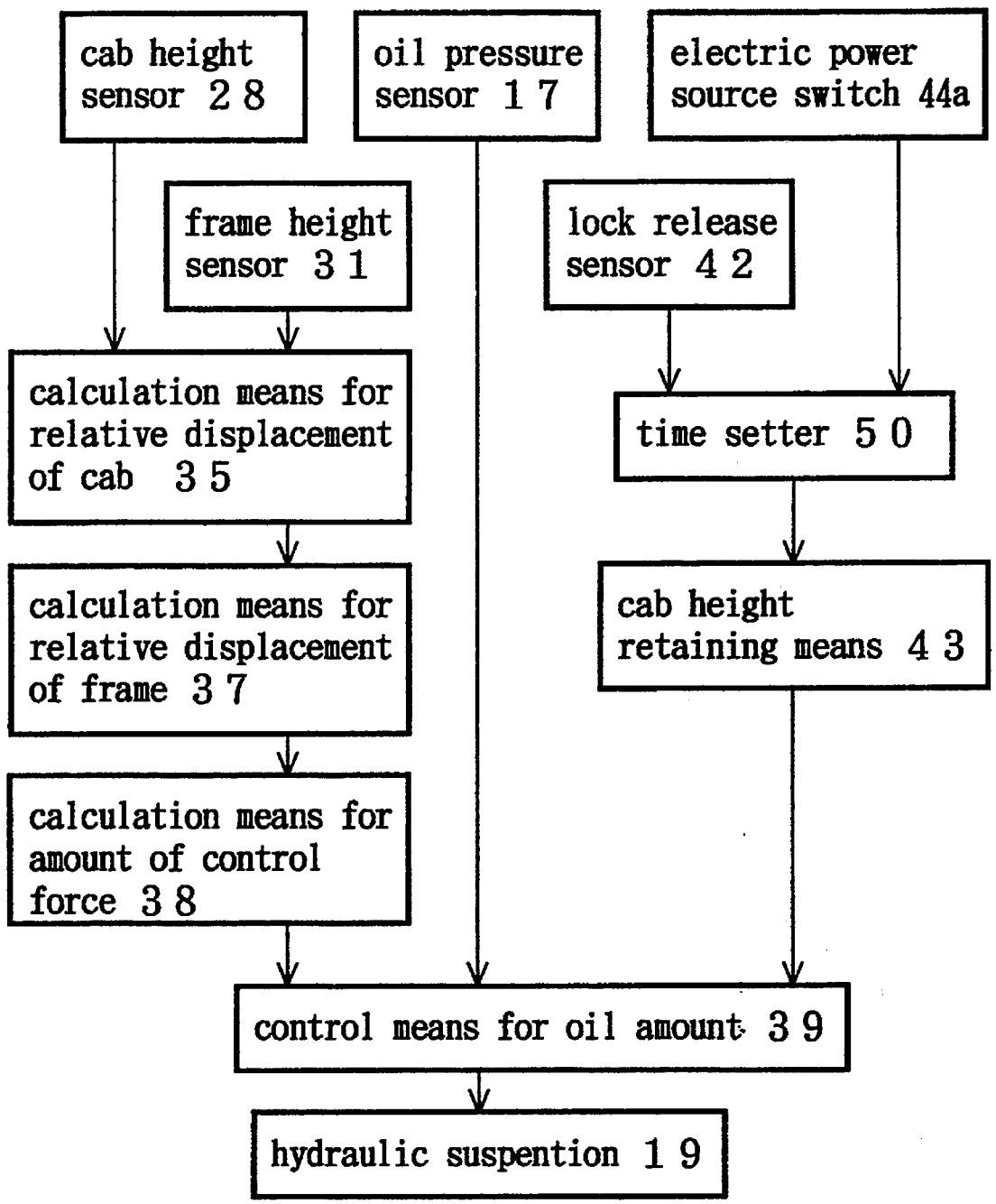
FIG. 9 is a block diagram representative of a cab support holding control and cab attitude control program according to a modified embodiment of the present invention.
Figure 10:
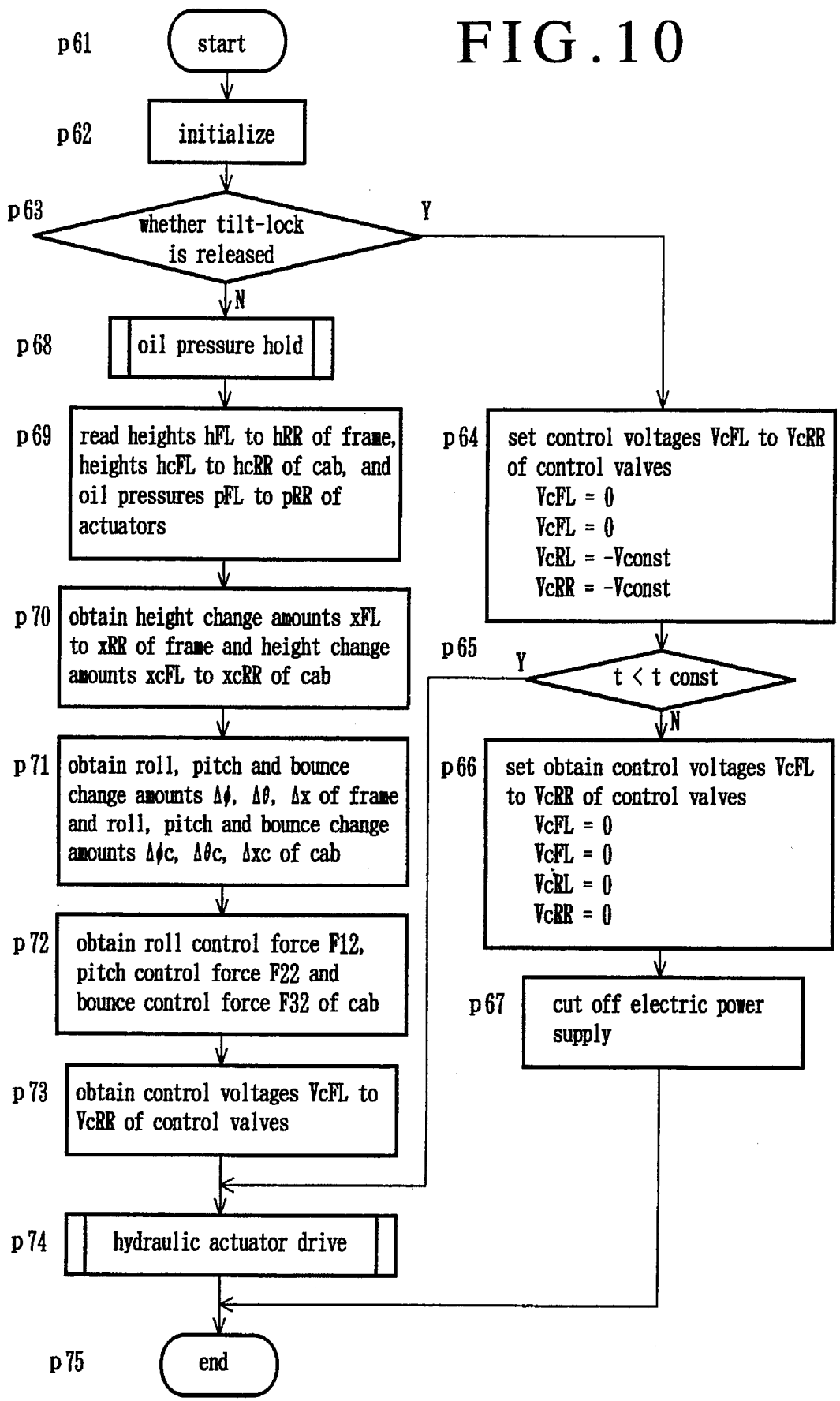
FIG. 10 is a flow chart of the control program.

A modified cab support holding embodiment is shown in FIGS. 9 and 10. When the tilt-lock of the cab 3 is released for maintenance and repair of the engine, a timer 50 (FIG. 9) is actuated to energize the electronic control device 47. Accordingly, lock-release voltages cFL to VcRR are applied to the oil control valves 16 to drive the hydraulic suspension mechanisms 19FL–19RR and the heights of the rear cab support seats 55 (FIG. 11) are set at a predetermined value. After passage of a predetermined time period, tconst, the auxiliary power supply switch 44a (FIG. 3) opens to deenergize the electronic control device 47. The oil control valves 16, therefore, return to a neutral closed position and the hydraulic suspension mechanisms 19RL and 19RR are kept at the predetermined height. Accordingly, when the cab 3 is tilted down onto the frame 25, the receiving seats 55 of the hydraulic suspension mechanisms 19RL and 19RR are positioned on the locus of engaging members of the cab 3 which, therefore, can be positively locked.

It is noted that in the normal running, the attitude control of the cab is carried out without using a signal of the acceleration sensor.

FIG. 10 is a flow chart for carrying out the aforementioned vehicle height holding control and attitude control of the cab by the electronic control device 47 comprised of a microcomputer. The present control program is repeatedly executed every predetermined time. p61 to p65 represent the steps of the control program. In p61, the present control program starts. In p62, the initialization is made. In p63, determination is made whether the tilt-lock of the cab 3 is released.

When the tilt-lock of the cab 3 is released in p63, the control voltages VcFL to VcRR of the oil amount control valves 16 are set to VcFL=0, VcRR=0, VcRL=Vconst and VcRR=Vconst in p64. In p64, determination is made whether a passage time t after the power supply switch 44a is closed is smaller than a predetermined value tconst. When the passage time t is smaller than the predetermined value tconst, the program shifts to the hydraulic suspension mechanism driving routine shown in FIG. 7 in p74, in which the hydraulic suspension mechanism 19 is driven to set the vehicle height of the cab 3 to a predetermined value. When the passage time t is larger the predetermined value tconst, the control voltages VcFL to VcRR of the oil amount control valves 16 are set to 0 in p66, and the power supply switch 44a of the electronic control device 47 is opened in p67. In p75, the program terminates.

When the tilt-lock of the cab 3 is not released in p63, the program shifts to the oil pressure holding routine shown in FIG. 6 in p68, in which the switching valve 12 is driven on the basis of a signal of the hydraulic sensor 9 to keep the oil pressure supplied to the pipe 7 at a predetermined value pc. In p69, the vehicle heights hFL to hRR of the vehicle frame 25, the vehicle heights hcFL to hcRR of the cab 3, and the oil pressures pFL to pRR of the hydraulic suspension mechanisms 19FL to 19RR are read from the vehicle height sensor 31, the vehicle height sensor 28, and the hydraulic sensor 17, respectively.

In p70, the vehicle height change amounts xFL to xRR of the vehicle frame 25 and the vehicle height change amounts xcFL to xcRR of the cab 3 are obtained from the vehicle heights hFL to hRR of the vehicle frame 25 and the vehicle heights hcFL to hcRR of the cab 3, respectively. In p71, relative displacement amounts, that is, the roll displacement amount $\Delta\phi$, the pitch displacement amount $\Delta\theta$ and the bounce displacement amount $\Delta x$ of the vehicle frame 25, and relative displacement amounts, that is, the roll displacement amount $\Delta\phi$ c and the bounce displacement amount $\Delta$ xc of the cab 3 are obtained from the vehicle height change amounts xFL to xRR of the vehicle frame 25 and the vehicle height change amounts xcFL to xcRR of the cab 3, respectively.

In p72, control amounts, that is, roll control force F12, the pitch control force F22 and the bounce control force F32 of the cab 3 are obtained from the roll displacement amount $\Delta\phi$, the pitch displacement amount $\Delta\theta$ and the bounce displacement amount $\Delta$ x of the vehicle frame 25, the roll displacement amount $\Delta\phi$ c, the pitch displacement amount $\Delta\theta$ c and the bounce displacement amount $\Delta$ xc of the cab 3, and the roll displacement speed $\phi$ c, the pitch displacement speed $\theta$ c and the bounce displacement speed xc of the cab 3, respectively. In p73, the control voltages VcFL to VcRR of the oil amount control valves 16 corresponding to the control forces F21, F22 and F32 of the cab 3 are obtained. In p74, the step shifts to the hydraulic suspension mechanism driving routine, in which oil amounts of the hydraulic suspension mechanisms 19FL to 19RR are adjusted by the oil amount control valves 16. In p75, the program terminates.

Obviously, many modifications and variations of the present invention are possible in light of the above teachings. It is to be understood, therefore, that the invention can be practiced otherwise than as specifically described.

What is claimed is:

1. A road vehicle cab attitude controlling apparatus comprising:

frame means supported by wheels of the vehicle;

cab means mounted on said frame means and adapted for receiving occupants of the vehicle;

cab suspension means mounting said cab means on said frame means and allowing relative movement therebetween, said cab suspension means comprising a plurality of seats each supporting a different portion of said cab means and at least one said seat being detachable therefrom;

cab actuator means for activating said cab suspension means to adjust vertical displacements between said frame and said seats;

an engine mounted on said frame below said cab means;

auxiliary actuator means for producing pivotal movement of said cab means off of said one seat to provide access to said engine;

cab sensing means for detecting vertical displacements between said frame means and a plurality of spaced apart portions of said cab means and the vertical displacement between said frame means and said one seat; and control means for controlling said cab actuator means in response to said cab sensing means, and operable with said cab means supported on said one seat to maintain a given attitude of said cab means with respect to a road surface, and operable with said cab means detached from said one seat to establish a predetermined vertical displacement between said frame and said one seat.

2. Apparatus according to claim 1 wherein said one seat is detachable from one rear corner portion of said cab means, another of said seats is detachable from an opposite rear corner portion of said cab means, said auxiliary actuator means pivots said cab means off of both said one and another seats to provide access to said engine, and said control means is operable with said cab means detached from said one and another seats to establish said predetermined vertical displacement between said frame and each of said one and another seats.

3. Apparatus according to claim 1 including an initiator switch manually activatable into a condition providing power to said engine and said control means, manually activated release means activatable to facilitate said pivotal movement of said cab means, and auxiliary switch means for providing operating power to said control means in response to activation of said release means.

4. Apparatus according to claim 3 including frame support means permitting relative movement between said frame means and the wheels, frame sensing means for detecting frame displacements between the wheels and each of a plurality of positions on said frame adjacent to different portions of said cab means; and wherein said control means controls said cab actuator means in response to both said cab sensing means and said frame sensing means.

5. Apparatus according to claim 4 wherein said cab actuator means comprises a cab hydraulic actuator pivotally connected between said frame means and each of said seats.

6. Apparatus according to claim 5 wherein each of said frame displacements is substantially vertical.

7. Apparatus according to claim 6 wherein said one seat is detachable from one rear corner portion of said cab means, another of said seats is detachable from an opposite rear corner portion of said cab means, said auxiliary actuator means pivots said cab means off of both said one and another seats to provide access to said engine, and said control means is operable with said cab means detached from said one and another seats to establish said predetermined vertical displacement between said frame and each of said one and another seats.

8. Apparatus according to claim 3 including timer means for controlling said auxiliary switch means to remove operating power from said control means a predetermined time period after activation of said release means.

9. Apparatus according to claim 8 including frame support means permitting relative movement between said frame means and the wheels, frame sensing means for detecting frame displacements between the wheels and each of a plurality of positions on said frame adjacent to different portions of said cab means; and wherein said control means controls said cab actuator means in response to both said cab sensing means and said frame sensing means.

10. Apparatus according to claim 9 wherein said cab actuator means comprises a cab hydraulic actuator pivotally connected between said frame means and each of said seats.

11. Apparatus according to claim 10 wherein each of said frame displacements is substantially vertical.

12. Apparatus according to claim 11 wherein said one seat is detachable from one rear corner portion of said cab means, another of said seats is detachable from an opposite rear corner portion of said cab means, said auxiliary actuator means pivots said cab means off of both said one and another seats to provide access to said engine, and said control means is operable with said cab means detached from said one and another seats to establish said predetermined vertical displacement between said frame and each of said one and another seats.

* * * * *

UNITED STATES PATENT AND TRADEMARK OFFICE
CERTIFICATE OF CORRECTION

PATENT NO. : 5,623,410
DATED : April 22, 1997
INVENTOR(S) : Furihata et al

It is certified that error appears in the above-indentified patent and that said Letters Patent is hereby corrected as shown below:

Column 1, line 12, cancel "levelling" and substitute therefor --leveling--.

Column 1, line 18, cancel "titled' and substitute therefor --tilted--.

Signed and Sealed this

Twenty-second Day of July, 1997

Attest:

BRUCE LEHMAN

Attesting Officer

Commissioner of Patents and Trademarks